United States Patent
Yang et al.

(10) Patent No.: US 7,499,138 B2
(45) Date of Patent: Mar. 3, 2009

(54) PANEL AND A LIQUID CRYSTAL DISPLAY INCLUDING THE PANEL

(75) Inventors: Young-Chol Yang, Kunpo (KR); Kyong-Ju Shin, Yongin (KR); Tae-Hwan Kim, Seoul (KR); Sang-Il Kim, Suwon (KR)

(73) Assignee: Samsung Electronics Co., Ltd. (KR)

( * ) Notice: Subject to any disclaimer, the term of this patent is extended or adjusted under 35 U.S.C. 154(b) by 88 days.

(21) Appl. No.: 10/523,610

(22) PCT Filed: Sep. 17, 2002

(86) PCT No.: PCT/KR02/01742

§ 371 (c)(1), (2), (4) Date: Dec. 2, 2005

(87) PCT Pub. No.: WO2004/015487

PCT Pub. Date: Feb. 19, 2004

(65) Prior Publication Data
US 2006/0109401 A1 May 25, 2006

(30) Foreign Application Priority Data
Aug. 8, 2002 (KR) ............................ 2002-0046816

(51) Int. Cl.
G02F 1/1343 (2006.01)
G02F 1/13 (2006.01)

(52) U.S. Cl. .................................... 349/141; 349/201

(58) Field of Classification Search ................. 349/201, 349/141, 43
See application file for complete search history.

(56) References Cited
U.S. PATENT DOCUMENTS
5,046,827 A 9/1991 Frost et al.
5,299,289 A * 3/1994 Omae et al. ................. 349/201
5,402,141 A 3/1995 Haim et al.
5,434,690 A * 7/1995 Hisatake et al. ................ 349/8

(Continued)

FOREIGN PATENT DOCUMENTS
JP 05-264246 10/1993

(Continued)

Primary Examiner—James A Dudek
(74) Attorney, Agent, or Firm—Cantor Colburn LLP

(57) ABSTRACT

An LCD according to the present invention includes lower and upper panels facing each other and a liquid crystal layer interposed therebetween. The upper panel includes a black matrix formed on an inner surface of an insulating substrate, having openings corresponding to pixel areas, and blocking the light leakage between the pixel areas, a plurality of red, green, and blue color filter sequentially arranged in the pixel regions, a flat layer formed on the red, green and blue color filters, and a common electrode formed on the flat layer, made of transparent conductive material such as ITO (indium tin oxide) or IZO (indium zinc oxide), and supplied with a predetermined voltage for driving the liquid molecules in cooperation with the pixel electrodes. In addition, a light diffraction layer having micro structure of slit pattern or diffraction lattice is formed between the black matrix and the red, green, or blue color filters. The light diffraction layer is made of transparent conductive material such as ITO or IZO or transparent insulating material such as silicon nitride or silicon oxide. The gap between the slits or width of slits of the light diffraction layer is preferably equal to or less than seven microns and it is possible to have two or more different widths or gaps in the range of equal to or less than 7 microns.

8 Claims, 10 Drawing Sheets

U.S. PATENT DOCUMENTS

| | | | |
|---|---|---|---|
| 5,654,782 A | 8/1997 | Morokawa et al. | 349/143 |
| 6,426,812 B2 * | 7/2002 | Ichikawa et al. | 359/22 |
| 2002/0001109 A1 * | 1/2002 | Hamano et al. | 359/9 |

FOREIGN PATENT DOCUMENTS

| | | |
|---|---|---|
| JP | 06186415 | 7/1994 |
| JP | 06308512 | 11/1994 |
| JP | 07072485 | 3/1995 |
| JP | 10/090708 | 4/1998 |
| JP | 10142591 | 5/1998 |
| JP | 10312033 | 11/1998 |
| JP | 11337922 | 12/1999 |
| JP | 2001143513 | 5/2001 |

* cited by examiner

PANEL AND A LIQUID CRYSTAL DISPLAY INCLUDING THE PANEL

BACKGROUND OF THE INVENTION (a) Field of the Invention

The present invention relates to a panel and a liquid crystal display including a panel, and in particular, to a panel including light diffraction layer and a liquid crystal display including the panel.

(b) Description of Related Art

A liquid crystal display (LCD) includes a lower panel provided with thin film transistors (TFTs), etc., an upper panel provided with color filters and a black matrix, etc., and a liquid crystal layer interposed therebetween. A plurality of pixel electrodes and a common electrode are formed on the respective panels or on a single panel and supplied with voltages. The LCD varies the voltages applied to the pixel electrodes and the common electrode to change the orientations of liquid crystal molecules. In this way, the LCD adjust the transmittance of light and displays images.

The liquid crystal material of an LCD has birefringence that the refractive indices in a direction of molecular long axes and in a direction of molecular short axes are different from each other. Due to the birefringence, the refractive index which the light experiences depends on the viewing direction of the LCD, and this differentiates the polarization of an incident light with linear polarization after passing through the liquid crystal. Therefore, the color characteristic and the amount of the light in a slanted direction are different from those in a front direction. In particular, a twisted nematic (TN) LCD suffers severe problems such as the contrast ratio depending on the viewing angle, color shift, gray inversion, etc., due to the variation of the retardation of the light.

A technique for solving these problems is developed, which compensates the phase difference in a specific direction using phase difference compensation film. This technique is to solve the viewing angle problem by compensating the phase deviation of the light generated by the liquid crystal in an opposite manner using the compensation films. Then, the viewing angle is ensured in twisted nematic type LCD using the phase difference compensation films, however, the gray inversion in lower viewing angle, etc., still remains.

SUMMARY OF THE INVENTION

A motivation of the present invention is to provide an LCD capable of minimizing the gray inversion.

According to the motivation, a light diffraction layer having a slit pattern or a diffraction lattice is formed on a panel for an LCD of the present invention.

Here, the panel may include a black matrix having openings on pixel areas and red, green, and blue color filters formed on the pixel areas and arranged in sequence, and the light diffraction layer is preferably disposed between the black matrix and the red, green, and blue color filters.

Moreover, it is preferable that width and interval of the slit pattern are equal to or less than seven microns, and width and interval of the slit pattern may be uniform in each pixel area or may have at least two different values in each pixel area. Preferably, the light diffraction layer is made of transparent conductive material or transparent insulating material.

An LCD according to the present invention includes the above-mentioned panel, an additional panel facing the panel and a liquid crystal layer interposed between the two panels.

DETAILED DESCRIPTION OF PREFERRED EMBODIMENTS

Figure 1:
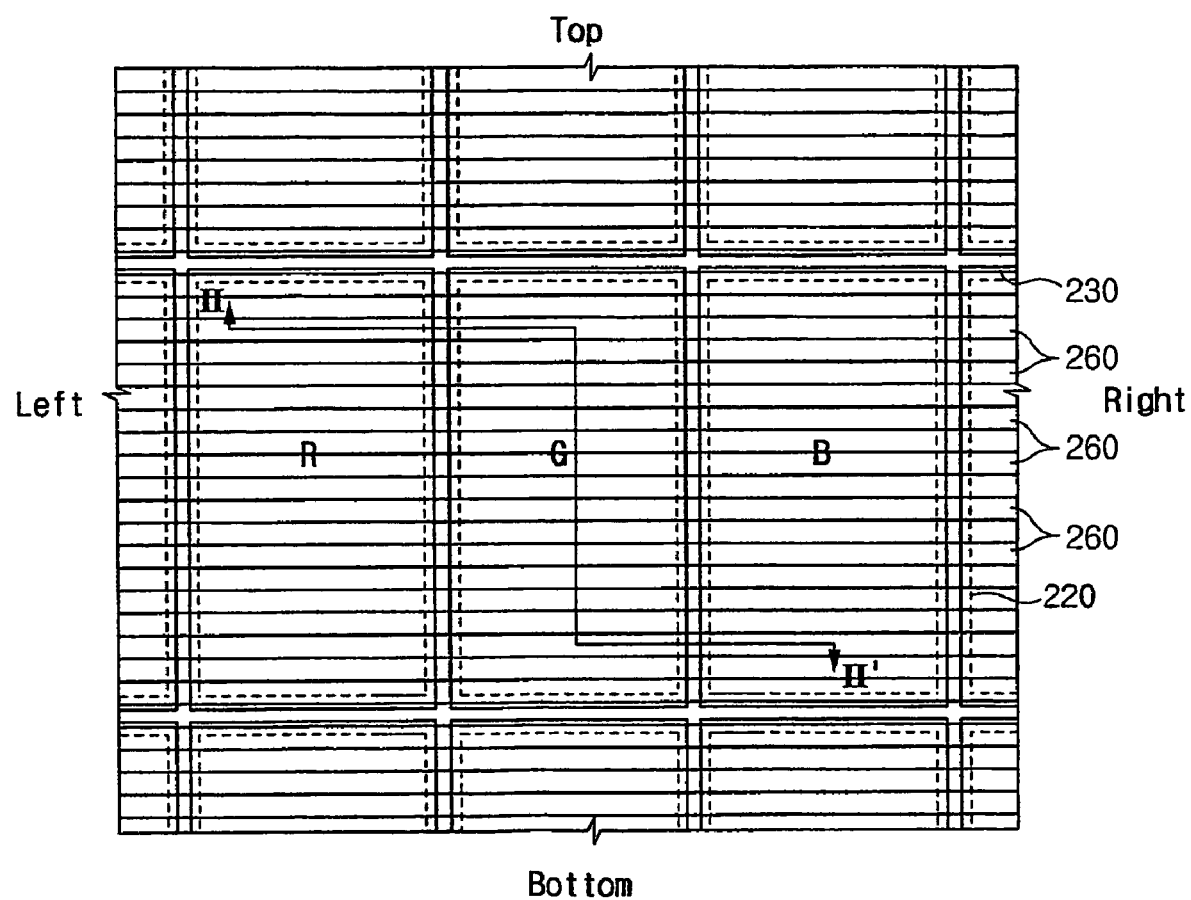
FIG. 1 is a layout view of an LCD according to an embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein.

In the drawings, the thickness of layers and regions are exaggerated for clarity. Like numerals refer to like elements throughout. It will be understood that when an element such as a layer, film, region, substrate or panel is referred to as being "on" another element, it can be directly on the other element or intervening elements may also be present. In contrast, when an element is referred to as being "directly on" another element, there are no intervening elements present. Then, a color filter panel, a transflective liquid crystal display, and a manufacturing method thereof according to embodiments of the present invention will be described with reference to the drawings.

Now, thin film transistor array panels and LCDs including panels according to embodiments of the present invention are described in detail with reference to the accompanying drawings.

Figure 2:
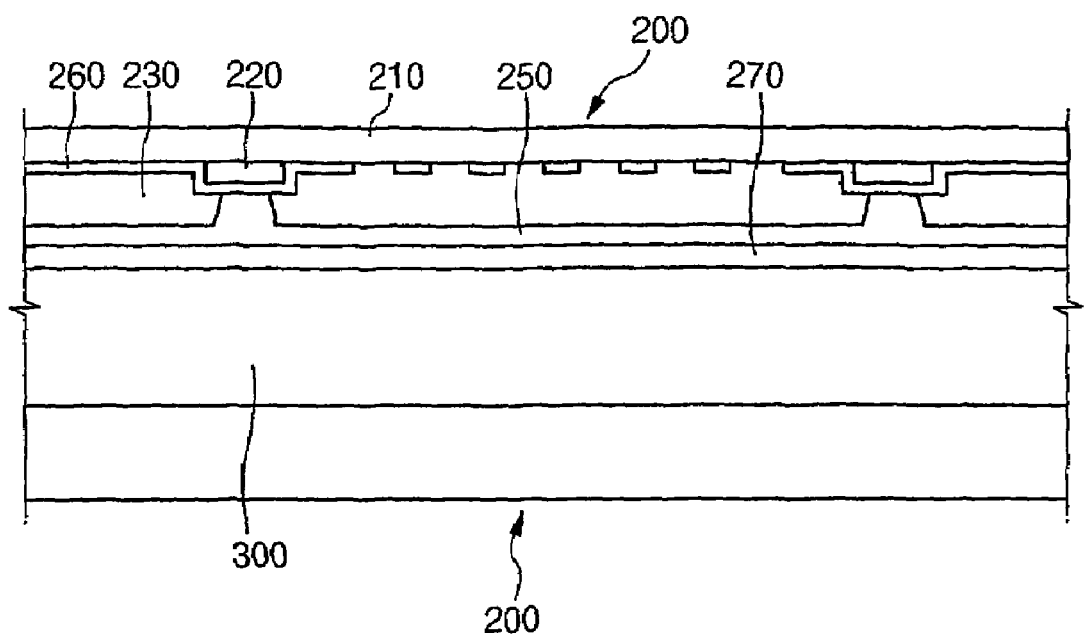
FIG. 2 is a sectional view of an LCD shown in FIG. 1 taken along the line II-II'.

FIG. 1 is a layout view of an LCD according to an embodiment of the present invention, and FIG. 2 is a sectional view of an LCD shown in FIG. 1 taken along the line II-II'.

As shown in FIG. 1, an LCD according to an embodiment of the present invention includes lower and upper panels 100 and 200 facing each other and a liquid crystal layer 300 interposed therebetween. The dielectric anisotropy Δ∈ of the liquid crystal layer 300 is larger than zero. Liquid crystal molecules in the liquid crystal layer 300 have a twisted nematic configuration that the long axes of the liquid crystal molecules are parallel to the surfaces of the panels 100 and 200 and spirally twisted from one panel to the other in absence of electric field, and the liquid crystal molecules are oriented under application of electric field with a sufficient strength to the liquid crystal layer 300 such that long axes of the liquid crystal molecules are perpendicular to the surfaces of the panels 100 and 200 and parallel to the electric field.

The lower panel 100 includes a plurality of pixel electrodes for performing display operation formed on pixel areas arranged in a matrix, a plurality of gate lines and a plurality of data lines intersecting each other to define the pixel areas and transferring scanning signals and image signals, respectively, a plurality of TFTs electrically connected to the gate lines and the data lines and controlling the image signals from the data lines in response to the scanning signals from the gate lines, etc. The lower panel 100 is called TFT array panel.

The upper panel 200 includes a black matrix 220 formed on an inner surface of an insulating substrate 210, having openings corresponding to the pixel areas, and blocking the light leakage between the pixel areas, a plurality of red, green, and blue color filters 230 sequentially arranged in the pixel regions, a flat layer 250 formed on the red, green, and blue color filters 230, and a common electrode 270 formed on the flat layer 250, made of transparent conductive material such as ITO (indium tin oxide) or IZO (indium zinc oxide), and supplied with a predetermined voltage for driving the liquid molecules in cooperation with the pixel electrodes. In addition, a light diffraction layer 260 having micro structure of slit pattern or diffraction lattice is formed between the black matrix 220 and the red, green, or blue color filters 230. The light diffraction layer 260 is made of transparent conductive material such as ITO or IZO or transparent insulating material such as silicon nitride or silicon oxide. The gap between the slits or width of slits of the light diffraction layer 260 is preferably equal to or less than seven microns and it is possible to have two or more different widths or gaps in the range of equal to or less than 7 microns. Moreover, although the slits of the light diffraction layer 260 extend in a horizontal direction, the slits may extend in a vertical direction or a diagonal direction based on a direction in which the gray inversion is required to be minimized according to the viewing angle. The light diffraction layer 260 including the slits extending in horizontal direction has a function of equalizing the light by diffracting the light passing through the liquid crystal layer 300 in the vertical direction, thereby improving the gray inversion in the lower direction. This is described in detail with reference to the experimental examples and drawings.

The light diffraction layer 260 may be formed of a polymer dispersed liquid crystal layer or an organic layer having an embossed surface. Alternatively, it includes minute particles for diffracting the light.

Here, although the red, green, and blue color filters 230 are separated on the black matrix 220, two or more color filters 230 may overlap each other. Polarizers may be attached to outer surfaces of the two panels 100 and 200, which can polarize the light passing through the liquid crystal cell 100, 200, and 300, and transmission axes of the polarizers attached to the outer surfaces of the two panels 100 and 200 are parallel to or perpendicular to each other.

Here, the liquid crystal layer 300 is in a VA (vertically aligned) mode and has negative dielectric anisotropy. The liquid crystal molecules aligned substantially perpendicular to the panels 100 and 200 are aligned substantially parallel to the panels to the mid-plane of the two panels 100 and 200 upon application of sufficient voltages. A PVA (patterned vertically aligned) mode LCD including cutouts as domain dividing members provides a plurality of cutouts for the pixel electrodes and/or the common electrode, and cutouts of the pixel electrodes and cutouts of the common electrode may divide the pixel area into left and right domains and upper and lower domains.

Moreover, the liquid crystal layer 300 can have an alignment configuration of HAN (hybrid aligned nematic) mode or OCB (optically compensated bend) mode. An OCB mode LCD includes alignment layers for aligning the liquid crystal molecules substantially parallel to the surfaces of the panels 100 and 200 and substantially in a single direction. The liquid crystal molecules are aligned symmetrical to a mid-plane between the two panels and vary their orientations from a horizontal alignment at the surfaces of the panels to vertical alignment on the mid-plane of the two panels.

Next, experiments are described in detail with reference to the accompanying drawing as mentioned above.

Experiments

Experiments utilized liquid crystal cells in twisted nematic mode. A light diffraction layer 260 of ITO with thickness of about 1,200 Å or silicon nitride with thickness of about 3,000 Å was formed between color filters and a black matrix, and the luminance for several gray as function of the viewing angle in a lower vertical direction and the viewing angles in a vertical direction were measured. Here, the figures indicated by figure numbers including A show the cases that the light diffraction layer 260 is made of ITO, and those indicated by the figure numbers including B show the cases that the light diffraction layer 260 is made of silicon nitride. A slit pattern A is the case that the width and the gap of the slits are 6.5 microns and 4.5 microns, respectively, a slit pattern B is the case that the width and the gap of the slits are 5.0 microns and 3.25 microns, respectively, a slit pattern C is the case that a pixel area is trisected and the widths and the intervals of the slits in the sections are 5.0 microns and 3.0 microns, 6.0 microns and 4.0 microns, and 7.0 microns and 5.0 microns, respectively, and a slit pattern D is the case that a pixel area is bisected and the widths and the intervals of the sections are 5.0 microns and 3.0 microns, and 7.0 microns and 5.0 microns, respectively.

Figure 3:
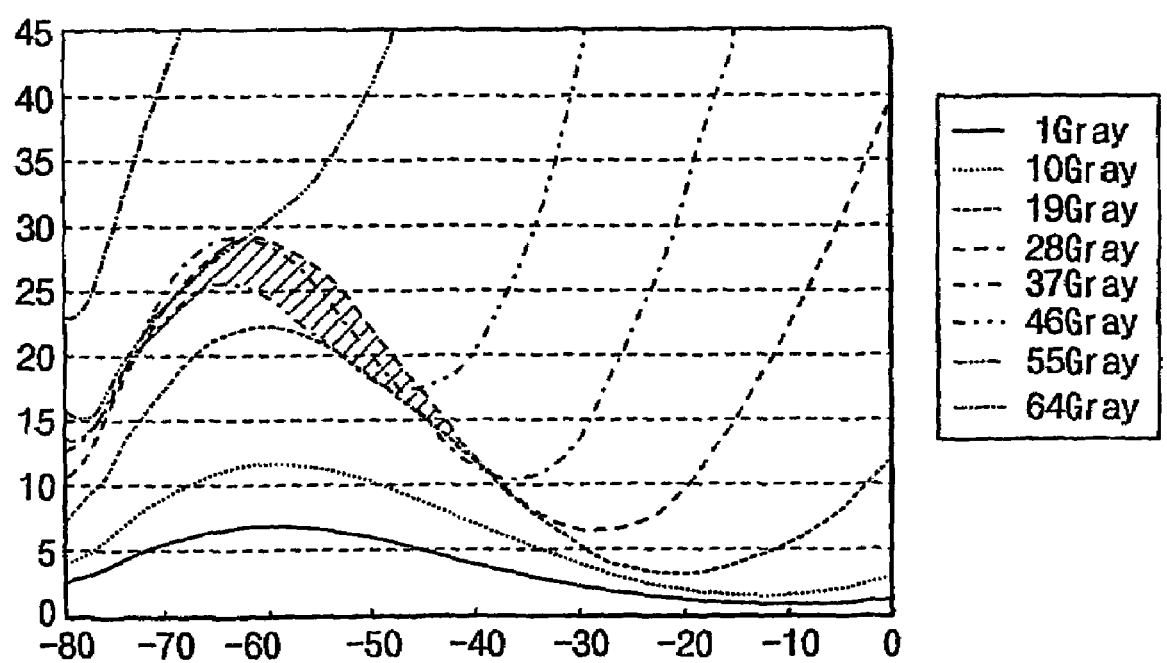
FIG. 3 is a graph showing the luminance for a plurality of grays as function of the viewing angle in a lower vertical direction of an LCD without a light diffraction layer.
Figure 4A:
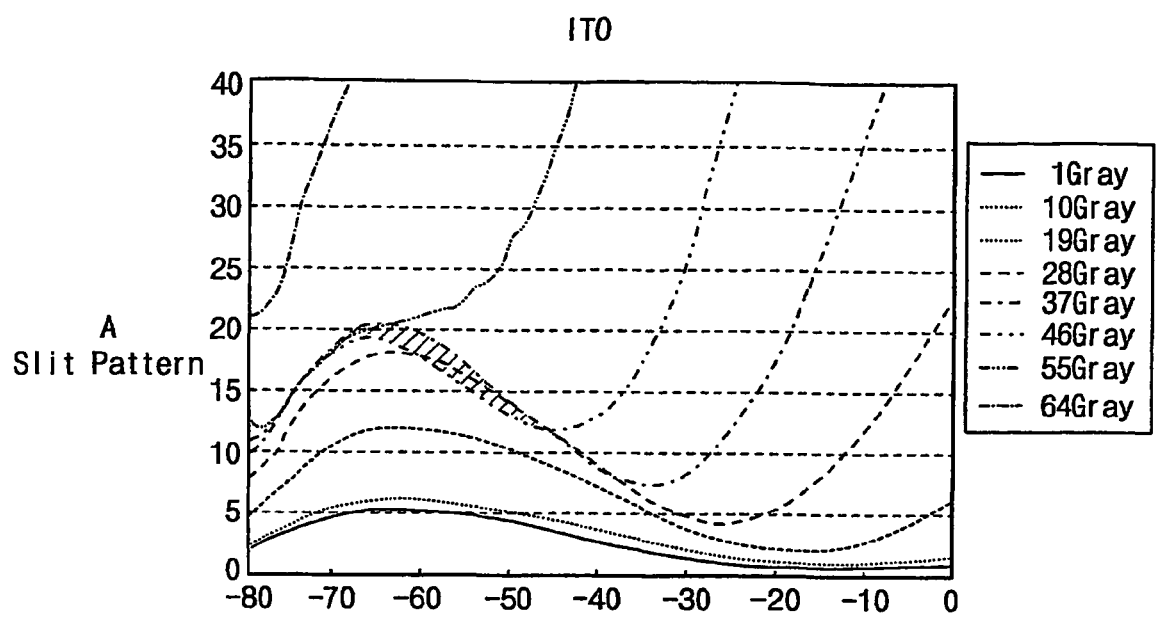
FIGS. 4A and 4B are graphs showing the luminance for a plurality of grays as function of the viewing angle in the lower vertical direction of LCDs including light diffraction layers with a slit pattern A.
Figure 4B:
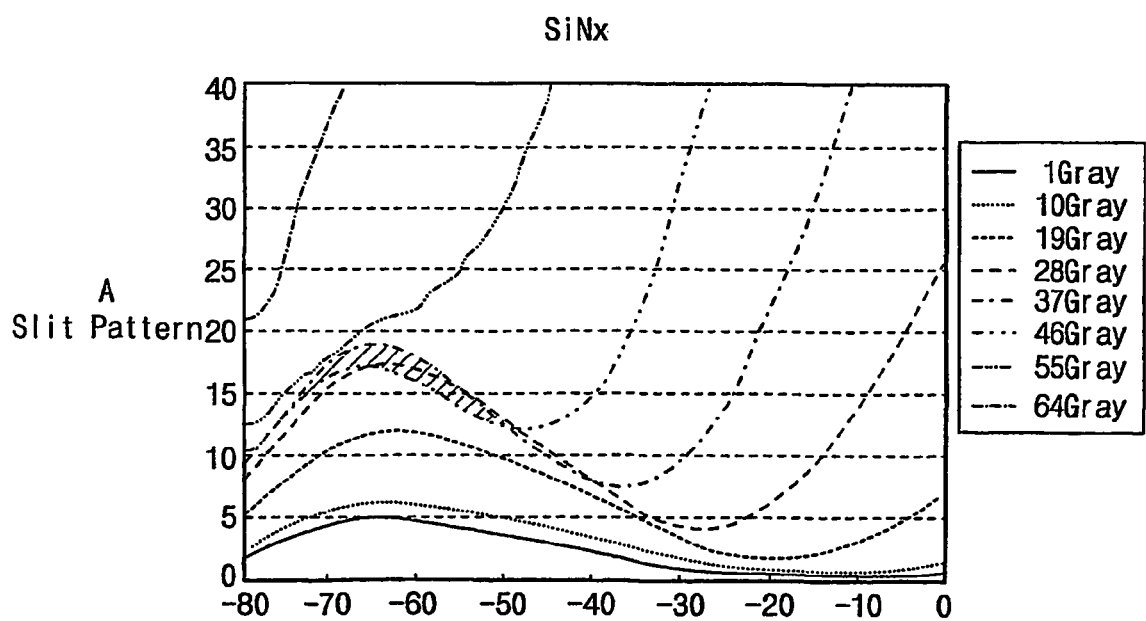
Figure 5A:
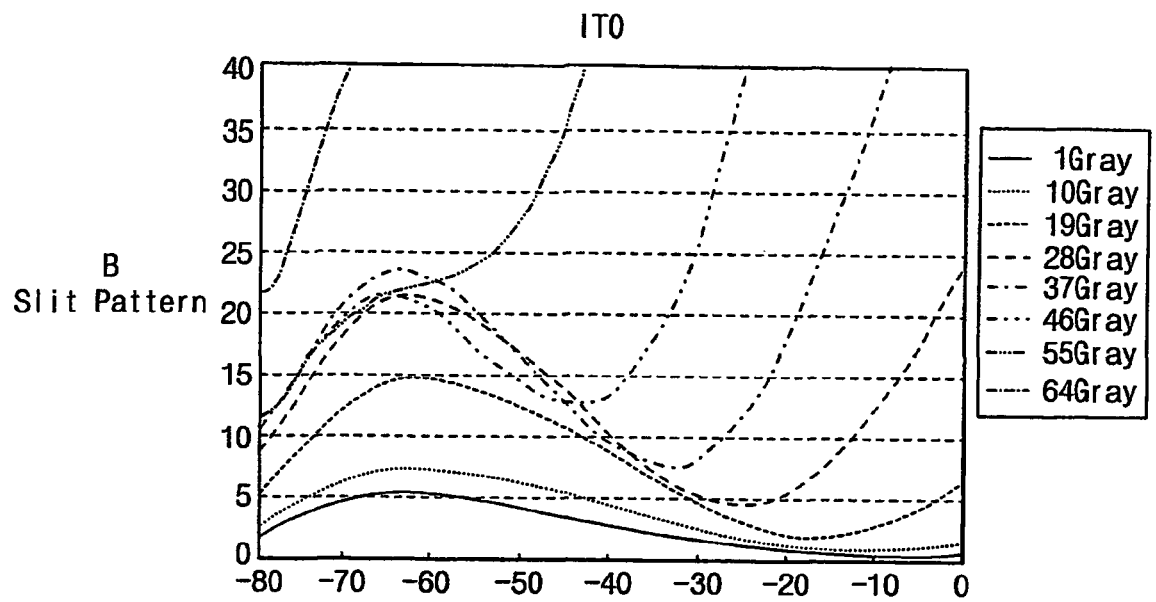
FIGS. 5A and 5B are graphs showing the luminance for a plurality of grays as function of the viewing angle in the lower vertical direction of LCDs including light diffraction layers with a slit pattern B.
Figure 5B:
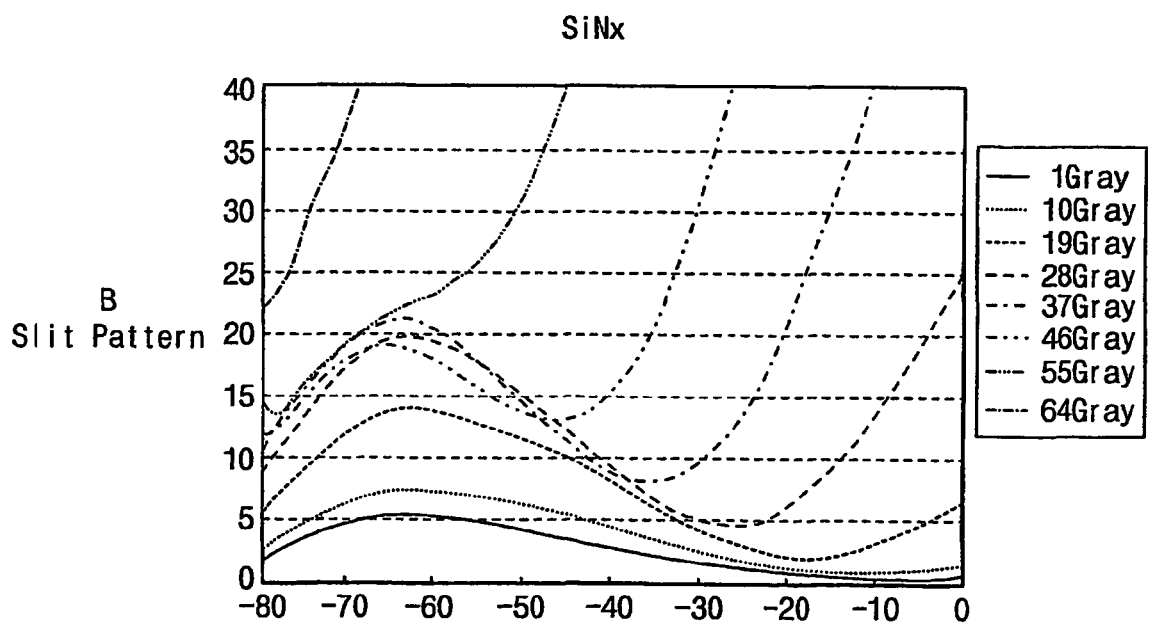
Figure 6A:
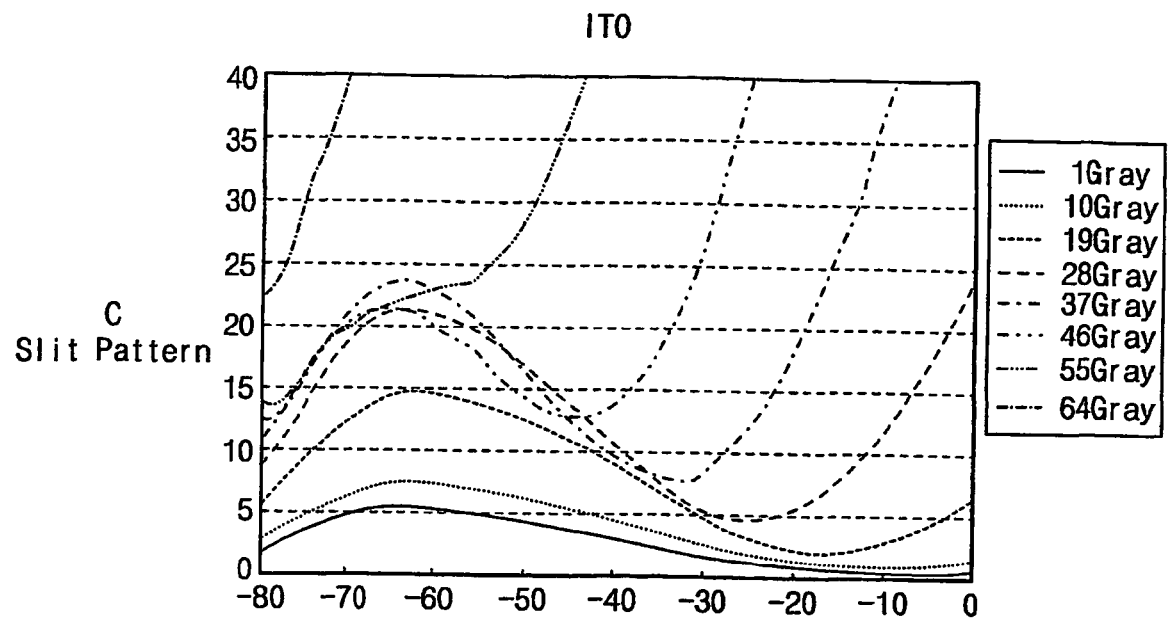
FIGS. 6A and 6B are graphs showing the luminance for a plurality of grays as function of the viewing angle in the lower vertical direction of LCDs including light diffraction layers with a slit pattern C.
Figure 6B:
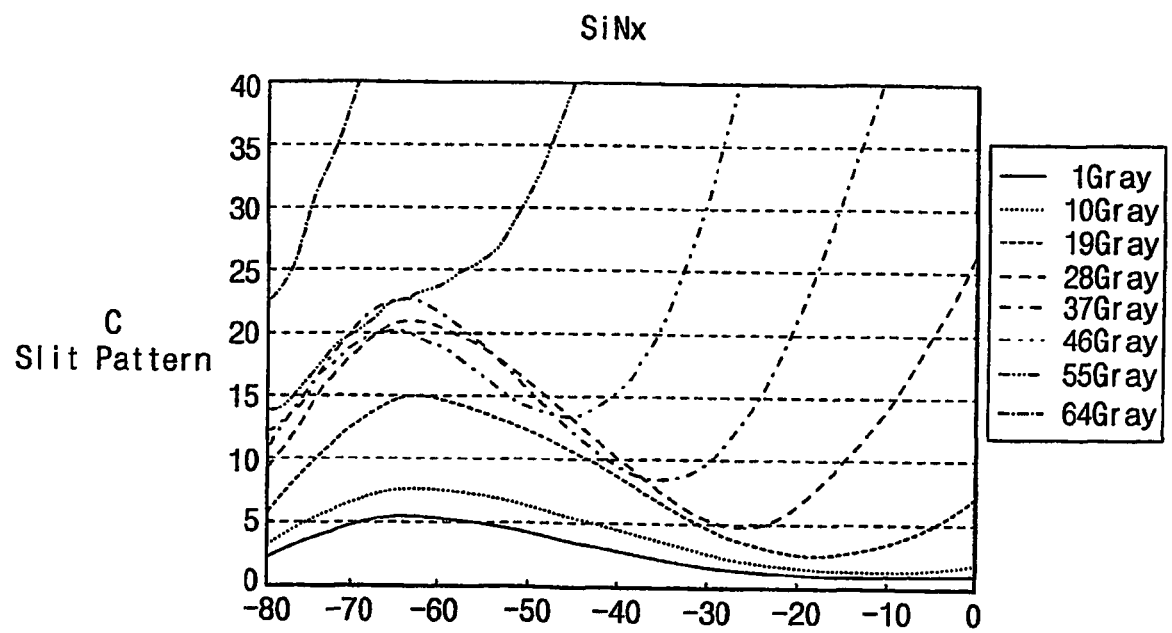
Figure 7A:
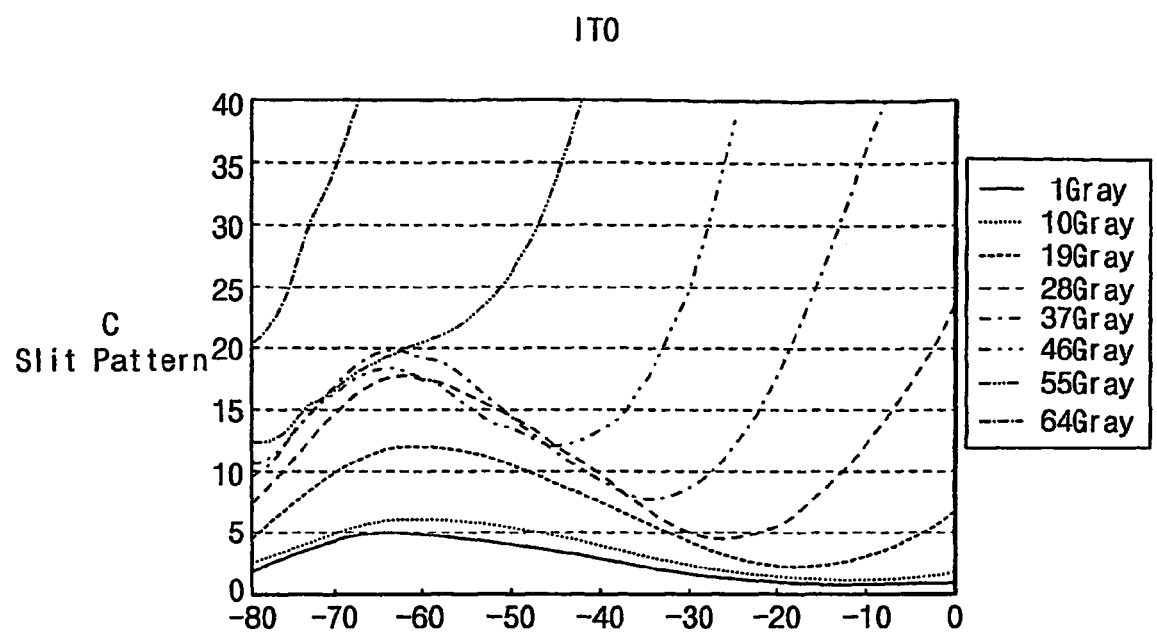
FIGS. 7A and 7B are graphs showing the luminance for a plurality of grays as function of the viewing angle in the lower vertical direction of LCDs including light diffraction layers with a slit pattern D.
Figure 7B:
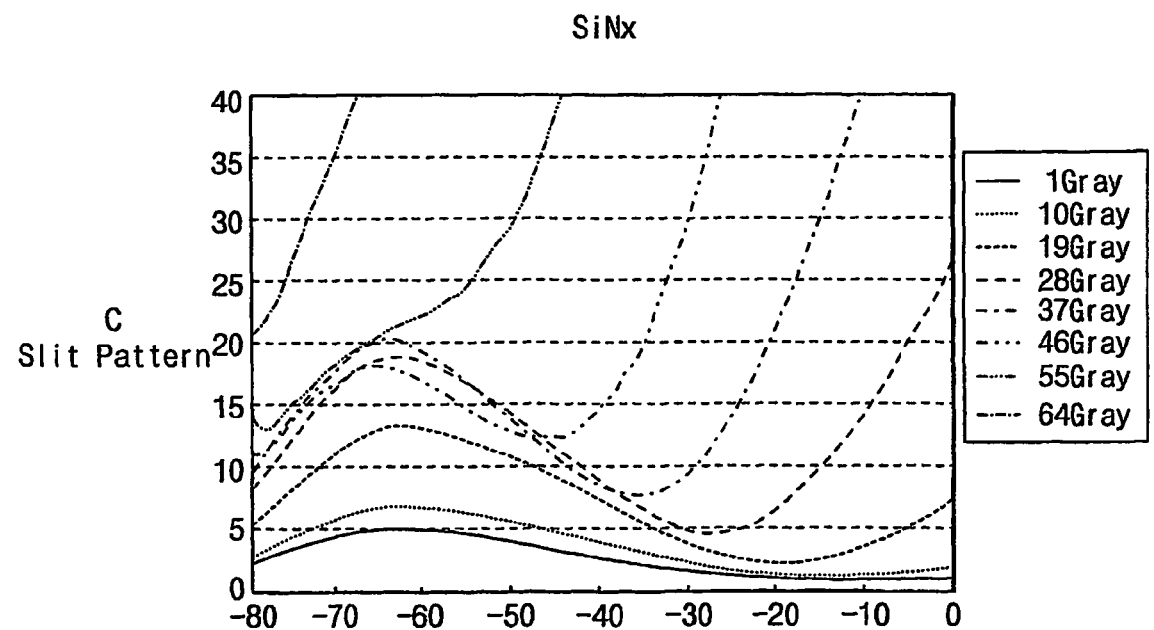

FIG. 3 is a graph showing the luminance for a plurality of grays as function of the viewing angle in a lower vertical direction of an LCD without a light diffraction layer, FIGS. 4A and 4B are graphs showing the luminance for a plurality of grays as function of the viewing angle in the lower vertical direction of LCDs including light diffraction layers with the slit pattern A, FIGS. 5A and 5B are graphs showing the luminance for a plurality of grays as function of the viewing angle in the lower vertical direction of LCDs including light diffraction layers with the slit pattern B, FIGS. 6A and 6B are graphs showing the luminance for a plurality of grays as function of the viewing angle in the lower vertical direction of LCDs including light diffraction layers with the slit pattern C, and FIGS. 7A and 7B are graphs showing the luminance for a plurality of grays as function of the viewing angle in the lower vertical direction of LCDs including light diffraction layers with the slit pattern D. In the figures, "1 Gray", "10 Gray", "19 Gray", "28 Gray", "37 Gray", "46 Gray", "55 Gray", and "64 Gray" mean grays, −10, −20, −30, −40, −50, −60, −70, and −80 mean the values of the viewing angle in the lower direction. The gray inversion that the luminance of a lower gray is higher than that of a higher gray is indicated as hatched areas.

As shown in FIG. 3, severe gray inversion is shown from 40 to 70 degrees in the lower viewing angle if there is no light diffraction layer. If the slit patterns A-D are applied, the gray inversion is drastically decreased as shown in FIGS. 4A to 7B although the gray inversion occurs in the same range of the viewing angle as that shown FIG. 3.

Next, the viewing angle measured under the same condition will be described.

Figure 8A:
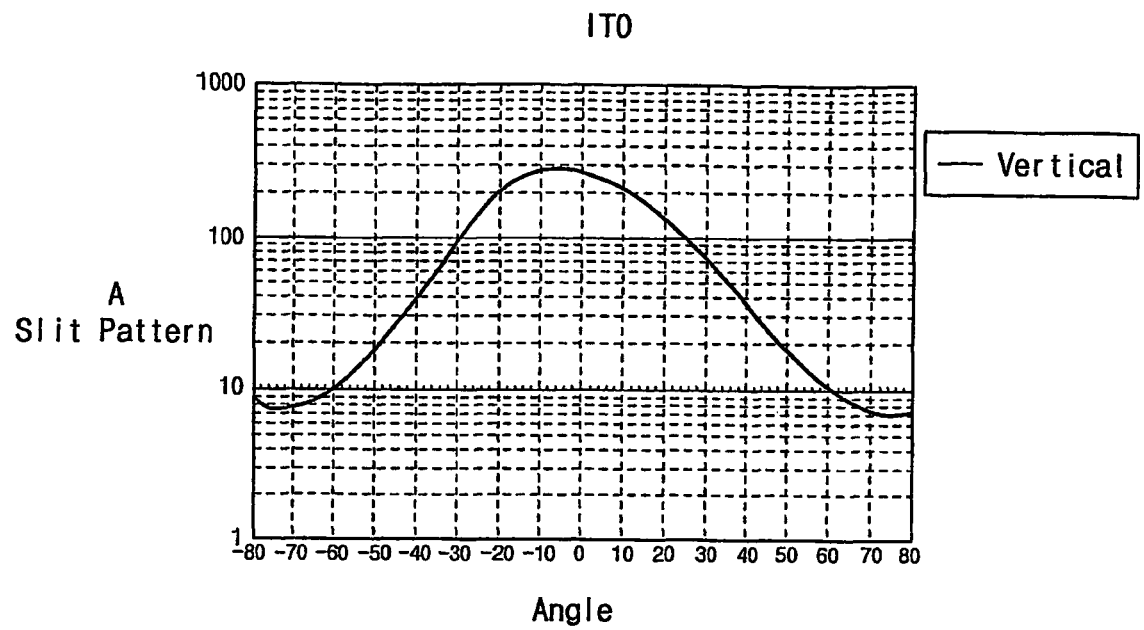
FIGS. 8A and 8B are graphs showing the measured contrast ratio as function of the viewing angle in the vertical direction of LCDs including light diffraction layers with the slit pattern A.
Figure 8B:
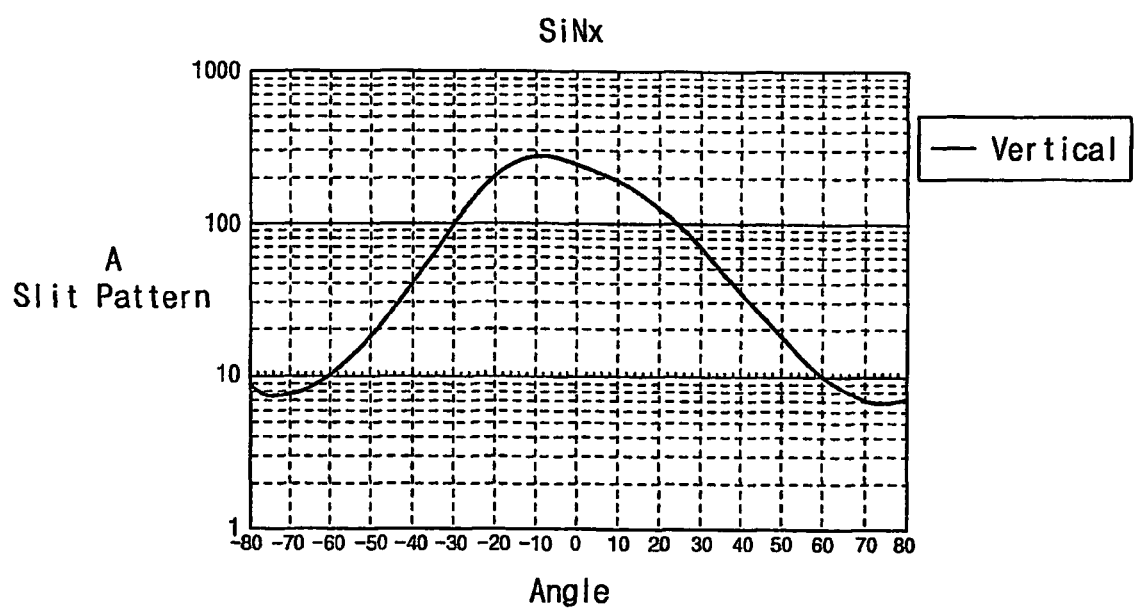
Figure 9A:
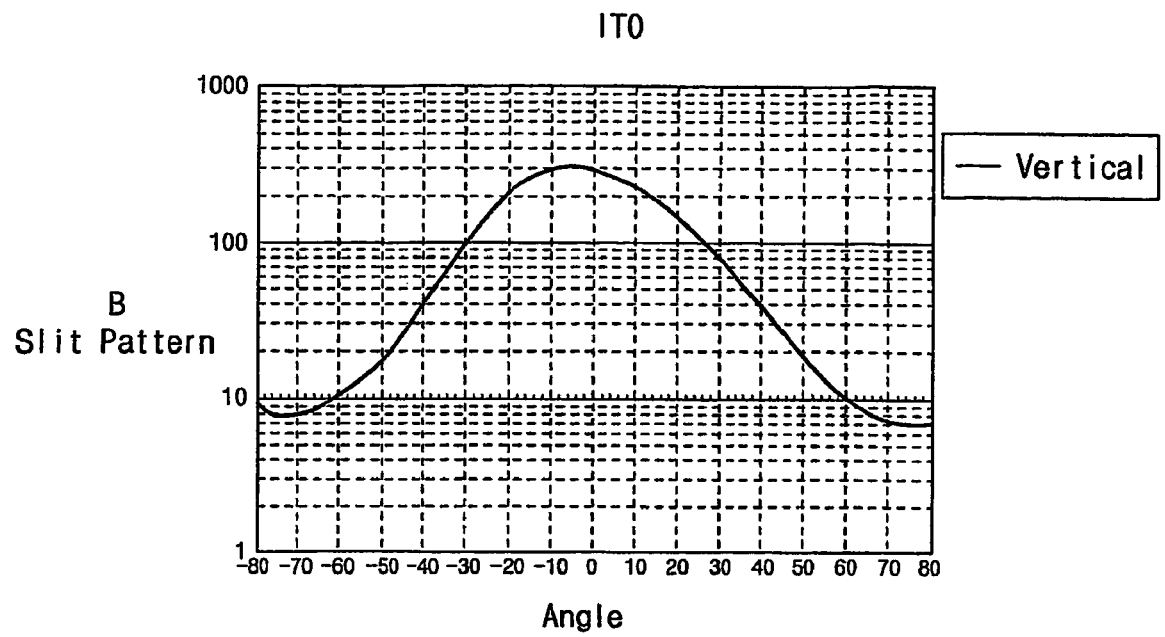
FIGS. 9A and 9B are graphs showing the measured contrast ratio as function of the viewing angle in the vertical direction of LCDs including light diffraction layers with the slit pattern B.
Figure 9B:
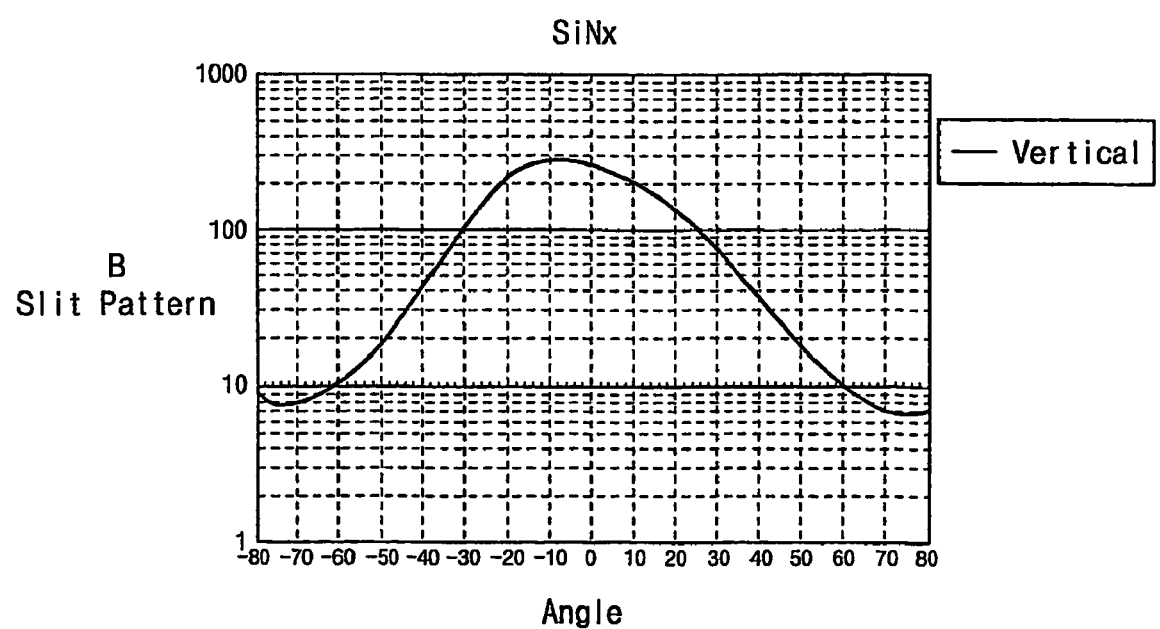
Figure 10A:
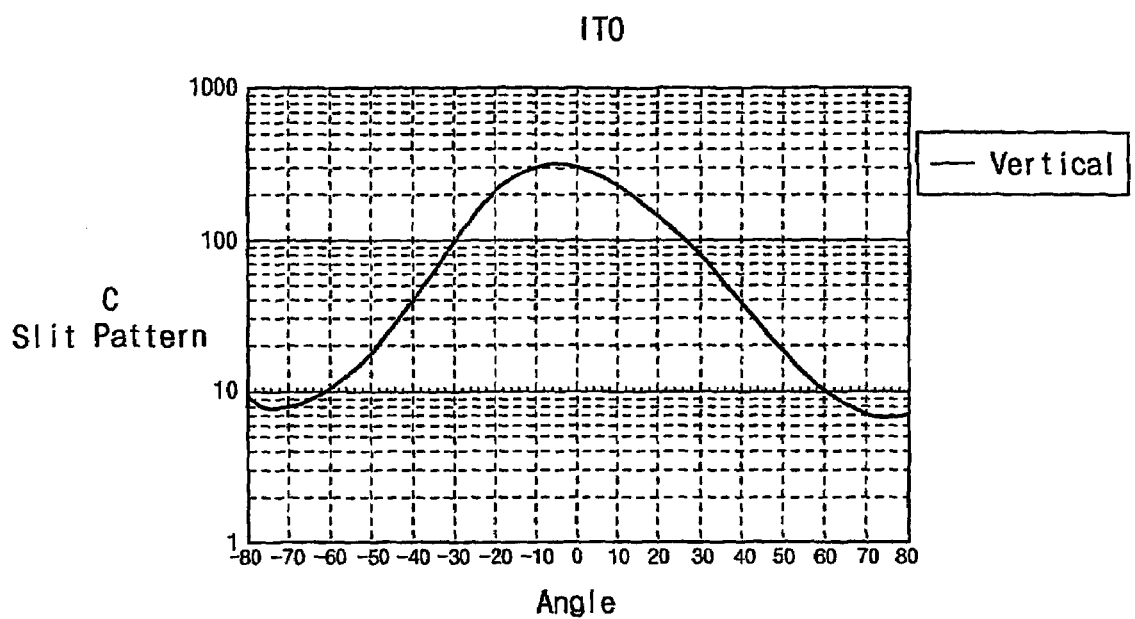
FIGS. 10A and 10B are graphs showing the measured contrast ratio as function of the viewing angle in the vertical direction of LCDs including light diffraction layers with the slit pattern C.
Figure 10B:
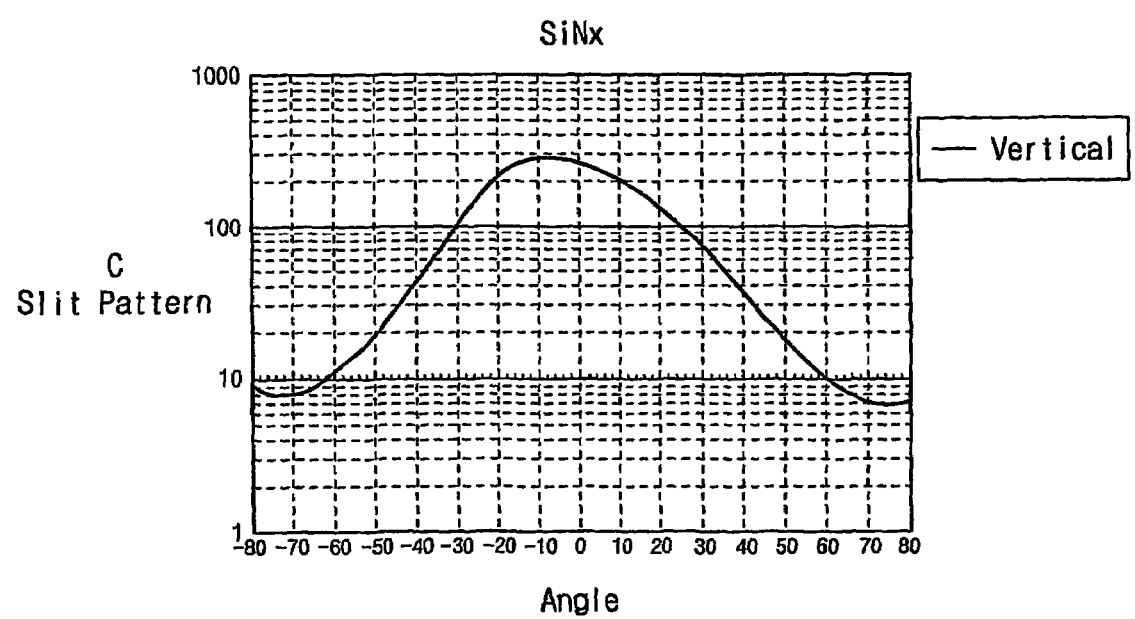
Figure 11A:
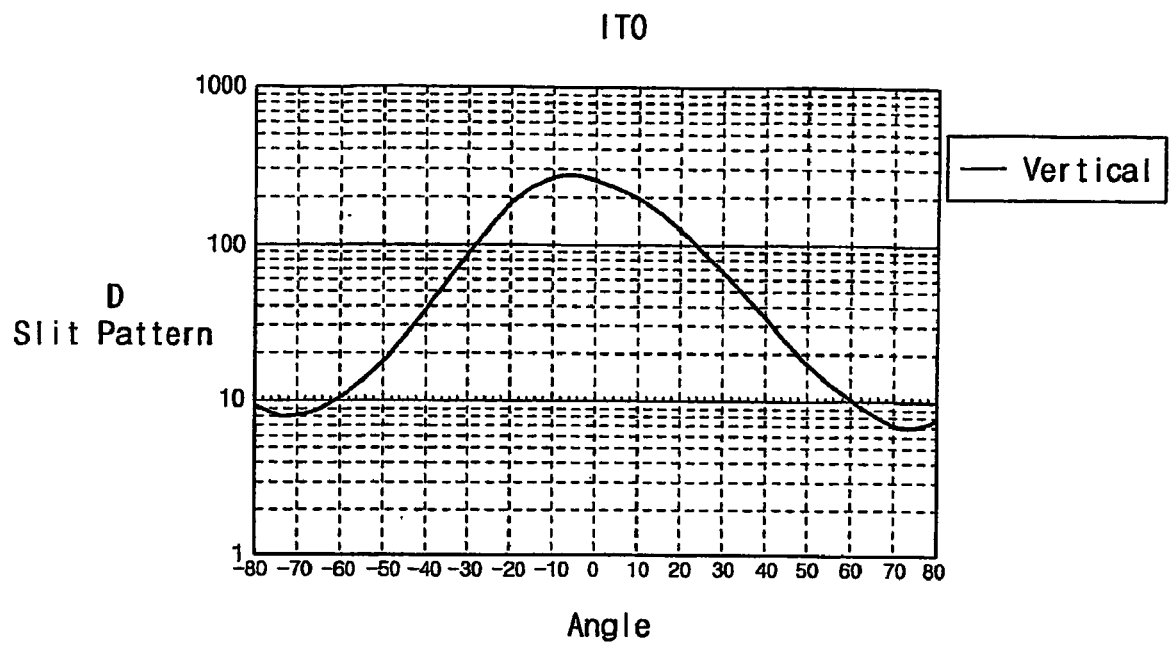
FIGS. 11A and 11B are graphs showing the measured contrast ratio as function of the viewing angle in the vertical direction of LCDs including light diffraction layers with the slit pattern D.
Figure 11B:
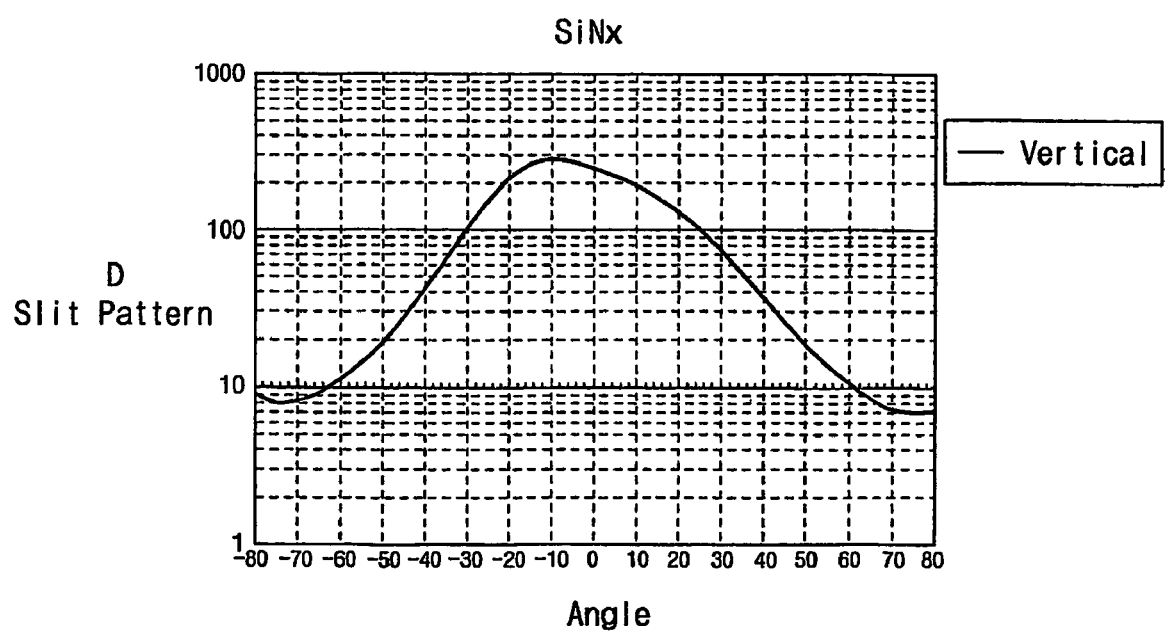

FIGS. 8A and 8B are graphs showing the measured contrast ratio as function of the viewing angle in the vertical direction of LCDs including light diffraction layers with the slit pattern A, FIGS. 9A and 9B are graphs showing the measured contrast ratio as function of the viewing angle in the vertical direction of LCDs including light diffraction layers with the slit pattern B, FIGS. 10A and 10B are graphs showing the measured contrast ratio as function of the viewing angle in the vertical direction of LCDs including light diffraction layers with the slit pattern C, and FIGS. 11A and 11B are graphs showing the measured contrast ratio as function of the viewing angle in the vertical direction of LCDs including light diffraction layers with the slit pattern D.

While the measured upper viewing angle and the measured lower viewing angle giving the contrast ratio equal to ten were equal to 55 and 58 degrees, respectively, when no light diffraction layer is applied, those were about 60 and 62 degrees, respectively, when the light diffraction layers having the slit patterns A-D were applied as shown in FIGS. 8A to 11B. Therefore, it can be known that the viewing angle is also increased if a light diffraction layer having a slit pattern is applied.

Therefore, according to LCDs of the present invention, the characteristics of the display devices are improved by applying a light diffraction layer having a slit pattern or a diffraction lattice to minimize the gray inversion.

What is claimed is:

1. A liquid crystal display comprising:
    a first panel comprising:
        an insulating substrate;
        a light diffraction layer formed directly on the inner surface or an outer surface of the insulating substrate and including a diffraction pattern; and
        a common electrode formed on the light diffraction layer;
    a second panel facing the first panel; and
    a liquid crystal layer interposed between the first panel and the second panel,
    wherein the light is diffracted by and passes through the light diffraction layer and the first panel further comprises a black matrix formed directly on an inner surface of the insulating substrate, the black matrix having a plurality of openings on pixel areas and red, green, and blue color filters formed on the pixel areas and arranged in sequence.

2. The liquid crystal display of claim 1, wherein the light diffraction layer is disposed between the black matrix and the red, green, and blue color filters.

3. The liquid crystal display of claim 1, wherein the width and interval of the slit pattern of the light diffraction layer are uniform in each pixel area.

4. The liquid crystal display of claim 1, wherein the width and interval of the slit pattern of the light diffraction layer have at least two different values in each pixel area.

5. The liquid crystal display of claim 1, wherein the light diffraction layer comprises transparent conductive material or transparent insulating material.

6. The liquid crystal display of claim 1, wherein the width and interval of the slit pattern of the light diffraction layer are equal to or less than seven microns.

7. The liquid crystal display of claim 5, wherein the light diffraction layer comprises transparent conductive material and the thickness of the light diffraction layer is about 1,200 Å.

8. The liquid crystal display of claim 5, wherein the light diffraction layer comprises transparent insulating material and the thickness of the light diffraction layer is about 3,000 Å.

* * * * *